United States Patent
Kurematsu

(10) Patent No.: US 9,228,642 B2
(45) Date of Patent: Jan. 5, 2016

(54) CHAIN TENSIONER

(71) Applicant: TSUBAKIMOTO CHAIN CO., Osaka-shi, Osaka (JP)

(72) Inventor: Yuji Kurematsu, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 287 days.

(21) Appl. No.: 14/029,841

(22) Filed: Sep. 18, 2013

(65) Prior Publication Data
US 2014/0100068 A1 Apr. 10, 2014

(30) Foreign Application Priority Data
Oct. 9, 2012 (JP) .................................. 2012-224436

(51) Int. Cl.
*F16H 7/08* (2006.01)
(52) U.S. Cl.
CPC ................ *F16H 7/08* (2013.01); *F16H 7/0836* (2013.01); *F16H 2007/0806* (2013.01); *F16H 2007/0859* (2013.01); *F16H 2007/0878* (2013.01)
(58) Field of Classification Search
CPC . F16H 7/08; F16H 7/0836; F16H 2007/0806; F16H 2007/0859; F16H 2007/0878
USPC .................................................. 474/109, 110
See application file for complete search history.

(56) References Cited

U.S. PATENT DOCUMENTS

| | | | |
|---|---|---|---|
| 2007/0179001 A1* | 8/2007 | Sass ...................... | F16H 7/0836 474/109 |
| 2008/0318717 A1* | 12/2008 | Kurematsu ............ | F16H 7/0848 474/110 |
| 2009/0197721 A1* | 8/2009 | Emizu ................... | F16H 7/0836 474/110 |
| 2012/0252615 A1* | 10/2012 | Konuma ............... | F16H 7/0848 474/110 |
| 2012/0252616 A1* | 10/2012 | Tawarada .............. | F16H 7/0848 474/110 |
| 2013/0178317 A1* | 7/2013 | Perissinoto ........... | F16H 7/0836 474/110 |
| 2014/0256486 A1* | 9/2014 | Lunk ........................ | F16H 7/08 474/110 |

FOREIGN PATENT DOCUMENTS

JP 09-177907 A 7/1997
JP 4376278 B2 12/2009

* cited by examiner

*Primary Examiner* — William E Dondero
*Assistant Examiner* — Robert T Reese
(74) *Attorney, Agent, or Firm* — Westerman, Hattori, Daniels & Adrian, LLP

(57) ABSTRACT

To provide a chain tensioner that has a simple structure, is universally usable and capable of supplying sufficient and necessary oil when restarted after a long time after the stop of oil supply, and enables reduction of its length and size. Urging unit 140 provided in an oil pressure chamber 101 to be extendable and contractible urges a plunger 120 outward from a plunger bore 111 in a tensioner body 110 of the chain tensioner 100. A connection groove 122 is formed in the outer circumference of the plunger 120 to form a supply chamber 102. An oil reservoir chamber 123 is formed inside the plunger 120. A leak groove 125 is formed in the outer circumference of the plunger 120 on the side of the oil pressure chamber 101 such as to extend into the supply chamber 102.

8 Claims, 9 Drawing Sheets

CHAIN TENSIONER

BACKGROUND OF THE INVENTION

1. Field of the Invention

The present invention relates to a chain tensioner that includes a tensioner body having a cylindrical plunger bore with an open end, a cylindrical plunger slidable within the plunger bore, and urging unit accommodated inside an oil pressure chamber formed between the plunger bore and the rear end of the plunger such as to be able to expand and contract and to urge the plunger outward, the chain tensioner being capable of maintaining suitable tension of a chain.

2. Description of the Related Art

Chain tensioners are commonly used for maintaining suitable tension of chains. In a chain guide mechanism that slidably guides a transmission chain such as an endless roller chain passing over respective sprockets of a crankshaft and a cam shaft inside an engine room with a guide shoe, for example, it is known to urge a pivoting chain guide having the guide shoe with a chain tensioner to maintain suitable tension.

For example, as shown in FIG. 13, an endless timing chain CH passes over a drive sprocket S1 attached to a crankshaft and a pair of driven sprockets S2 and S3 attached to cam shafts in an engine room. A chain guide mechanism has a pivoting chain guide G1 and a stationary chain guide G2 for guiding this timing chain CH.

The stationary chain guide G2 is fixed in position in the engine room with two mounting shafts B1 and B2, while the pivoting chain guide G1 is attached in the engine room such as to be pivotable around the mounting shaft B0 in the plane in which the timing chain CH runs.

The chain tensioner 500 maintains the tension of the timing chain CH at a suitable level as well as reduces its vibration by pressing the pivoting chain guide G1.

The known chain tensioner 500 used in such a chain guide mechanism includes, for example, as shown schematically in FIG. 14, a tensioner body 510 having a cylindrical plunger bore 511 with an open end, a cylindrical plunger 520 in the plunger bore 511 to slide against the cylindrical surface 513 of the plunger bore 511, and urging unit that urges the plunger 520 outward from the plunger bore 511.

The urging unit is a coil spring 540 accommodated inside a cylindrical recess 521 in the cylindrical plunger 520 and compressed between the plunger and the bottom 512 of the plunger bore 511.

Oil is supplied from an oil supply hole 514 formed in the plunger bore 511, so that an oil pressure chamber 501 formed between the plunger bore 511 and the plunger 520 is filled with oil, which oil urges the plunger 520 outward. A check valve 550 (schematically shown as a check ball) stops the oil from flowing out from the oil supply hole 514.

As the plunger 520 reciprocates, oil flows through the small gap between the plunger 520 and the plunger bore 511, and the flow resistance provides the damping effect of slowing down the reciprocal movement of the plunger 520.

In such a known chain tensioner 500, when let stand for a long time after the oil supply is stopped (in the case with an engine, after the engine is stopped), there is a time lag before oil is supplied immediately after the next start-up, and as no oil is replenished but the oil in the oil pressure chamber 501 leaks out when the plunger 520 moves back and forth, there occurs a shortage of oil in the oil pressure chamber 501. Because of this shortage of oil, the damping force of the oil does not act on the plunger 520, which may sometimes lead to vibration and abnormal noise of the timing chain C, or damage the timing chain C.

It is also known to provide an oil reservoir chamber inside the plunger configured to supply oil into the oil pressure chamber (see Japanese Patent Application Laid-open No. H09-177907 and Japanese Patent Publication No. 4376278). A constant amount of oil is retained in the oil reservoir chamber, so that, even immediately after the start-up after a long non-use time, oil remaining in the oil reservoir chamber is supplied to the oil pressure chamber, to maintain the damping force of oil for the plunger and to prevent vibration or damage of the chain.

With the technique described in Japanese Patent Application Laid-open No. H09-177907, however, most of the oil supplied from the oil reservoir chamber (oil reserve chamber 9) into the oil pressure chamber (high pressure chamber 14) leaks out from the oil pressure chamber (high pressure chamber 14) through the gap between the plunger and the plunger bore (plunger chamber 4) as the plunger reciprocates immediately after the start-up, and leaks out from the oil supply hole (supply hole 12) or from the distal end of the plunger, so that the amount of oil in the oil reservoir chamber (oil reserve chamber 9) is reduced.

It is therefore necessary for the oil reservoir chamber (oil reserve chamber 9) to have a large capacity so as to keep enough oil inside during the time lag before oil is supplied from the oil supply hole (supply hole 12) immediately after the start-up, because of which the entire tensioner could not be made shorter and could hardly be made smaller.

With the technique described in Japanese Patent Publication No. 4376278, the oil supply hole (oil supply hole 122) is arranged in an upper part and oriented diagonally forward so that at least the oil that has leaked from the oil pressure chamber (high pressure oil chamber R) through the gap between the plunger and the plunger bore is prevented from leaking through the oil supply hole (oil supply hole 122) to the outside.

However, this configuration cannot be applied to a design in which oil is supplied laterally. Universal use of the tensioner was difficult because of the restrictions on the position of the oil supply hole (oil supply hole 122) or mounting orientation of the chain tensioner.

As the oil inevitably leaks out from the distal end of the plunger, the tensioner needs to have an oil reservoir chamber with a large volume as with the technique described in Japanese Patent Application Laid-open No. H09-177907, because of which the entire tensioner could not be made shorter and could hardly be made smaller.

SUMMARY OF THE INVENTION

The present invention is directed to solve these problems, and aims to provide a chain tensioner that has a simple structure, is universally usable and capable of supplying sufficient and necessary oil when restarted after along time after the stop of oil supply, and enables reduction of its length and size.

To solve the problems described above, the invention according to claim 1 provides a chain tensioner including: a tensioner body having a cylindrical plunger bore with an open end; a cylindrical plunger slidable within the plunger bore; urging unit accommodated inside an oil pressure chamber formed between the plunger bore and a rear end of the plunger such as to be able to expand and contract and to urge the plunger outward; a connection groove in an outer circumferential surface of the plunger to form a supply chamber between the connection groove and a cylindrical surface of the plunger bore; an oil reservoir chamber formed inside the plunger such as to communicate with the oil pressure chamber via a check valve and to communicate with the supply chamber through a plunger hole opened into the connection groove; an oil supply hole formed in the cylindrical surface of the plunger bore for supplying oil to the supply chamber; and a leak groove formed in the outer circumferential surface of the plunger on a side of the oil pressure chamber such as to extend from the oil pressure chamber to the supply chamber.

To solve the problems described above, in the invention according to claim 2, in addition to the configuration of the chain tensioner according to claim 1, the leak groove is located at a circumferentially same phase position as the plunger hole.

To solve the problems described above, in the invention according to claim 3, in addition to the configuration of the chain tensioner according to claim 2, the oil supply hole is located at a circumferentially different phase position from the plunger hole.

To solve the problems described above, in the invention according to claim 4, in addition to the configuration of the chain tensioner according to claim 1, the plunger hole has a larger diameter than the oil supply hole.

To solve the problems described above, in the invention according to claim 5, in addition to the configuration of the chain tensioner according to claim 1, a cylindrical recess open to the oil pressure chamber is formed in an end face of the plunger on a side of the oil pressure chamber, the check valve being accommodated in the cylindrical recess.

To solve the problems described above, in the invention according to claim 6, in addition to the configuration of the chain tensioner according to claim 5, the urging unit includes a coil spring having one end seated on a bottom of the plunger bore and the other end seated in the cylindrical recess.

To solve the problems described above, in the invention according to claim 7, in addition to the configuration of the chain tensioner according to claim 6, the check valve includes a ball seat secured to the plunger, a check ball capable of making sealing contact with an oil passage in the ball seat, and a retainer that guides the check ball, the other end of the coil spring being seated on an outer flange of the retainer in the cylindrical recess.

To solve the problems described above, in the invention according to claim 8, in addition to the configuration of the chain tensioner according to claim 6, the bottom of the plunger bore is formed as a circular flat surface with a same diameter as the coil spring, and has a tapered surface that connects the bottom with the cylindrical surface sliding with the plunger.

With the chain tensioner according to claim 1, with a leak groove formed in the outer circumferential surface of the plunger on a side of the oil pressure chamber such as to extend from the oil pressure chamber to the supply chamber, when the plunger reciprocates immediately after the start-up after a long non-use time, oil is supplied from the oil reservoir chamber to the oil pressure chamber via the check valve. Most of the oil in the oil pressure chamber leaks through the leak groove into the supply chamber, from where the oil is recovered into the oil reservoir chamber through the plunger hole.

Therefore, the amount of oil leaking to the outside from the distal end of the plunger through the gap between the plunger and the plunger bore is reduced irrespective of the position of the oil supply hole or the mounting orientation of the chain tensioner itself, so that much more oil can be recovered into the oil reservoir chamber from the plunger hole that opens to the supply chamber.

Therefore, even though there is little oil left in the oil reservoir chamber after the stop of oil supply, a sufficient and necessary amount of oil can be secured for the next start-up by reducing the amount of oil leaking outside and by circulating and recovering the oil from the oil pressure chamber into the oil reservoir chamber, which enables the oil reservoir chamber to have a smaller space, and the entire tensioner to be shorter and smaller.

The chain tensioner is more universally usable, as less oil leaks outside and more oil is recovered into the oil reservoir chamber irrespective of the position of the oil supply hole or the mounting orientation of the chain tensioner itself.

With the structure as set forth in claim 2, as the leak groove is located at a circumferentially same phase position as the plunger hole, more of the oil leaking through the leak groove into the supply chamber flows directly toward the plunger hole with the reciprocation of the plunger, so that more oil is recovered from the plunger hole into the oil reservoir chamber instead of leaking to the outside.

With the structure as set forth in claim 3, as the oil supply hole is located at a circumferentially different phase position from the plunger hole, less of the oil leaking through the leak groove into the supply chamber with the reciprocation of the plunger leaks to the outside from the oil supply hole, so that more oil is recovered from the plunger hole into the oil reservoir chamber instead of leaking to the outside.

With the structure as set forth in claim 4, as the plunger hole has a larger diameter than the oil supply hole, less of the oil leaking through the leak groove into the supply chamber with the reciprocation of the plunger leaks to the outside from the oil supply hole, so that more oil is recovered from the plunger hole into the oil reservoir chamber instead of leaking to the outside.

With the structure as set forth in claim 5, the check valve is accommodated in the cylindrical recess, so that there is no need to provide a space for accommodating the check valve in the oil pressure chamber of the plunger bore, and the entire tensioner can be made shorter and smaller.

With the structure as set forth in claim 6, the other end of the coil spring is seated in the cylindrical recess, so that there is no need to provide a long space for the oil pressure chamber in the plunger bore to accommodate the coil spring, and the entire tensioner can be made shorter and smaller.

With the structure as set forth in claim 7, the other end of the coil spring is seated on the outer flange of the retainer in the cylindrical recess, so that the check valve can be disposed inside the coil spring. As there is no need to provide a long space for the oil pressure chamber in the plunger bore, the entire tensioner can be made shorter and smaller.

With the structure as set forth in claim 8, one end of the coil spring seated on the bottom of the plunger bore is restricted from moving sideways by the tapered surface, so that looseness or displacement of the coil spring in the lateral direction inside the oil pressure chamber or the cylindrical recess can be prevented to allow smooth reciprocation of the plunger. Also, as the tensioner requires less space for allowing lateral displacement, it can be made shorter and smaller.

DESCRIPTION OF THE PREFERRED EMBODIMENTS

Figure 1:
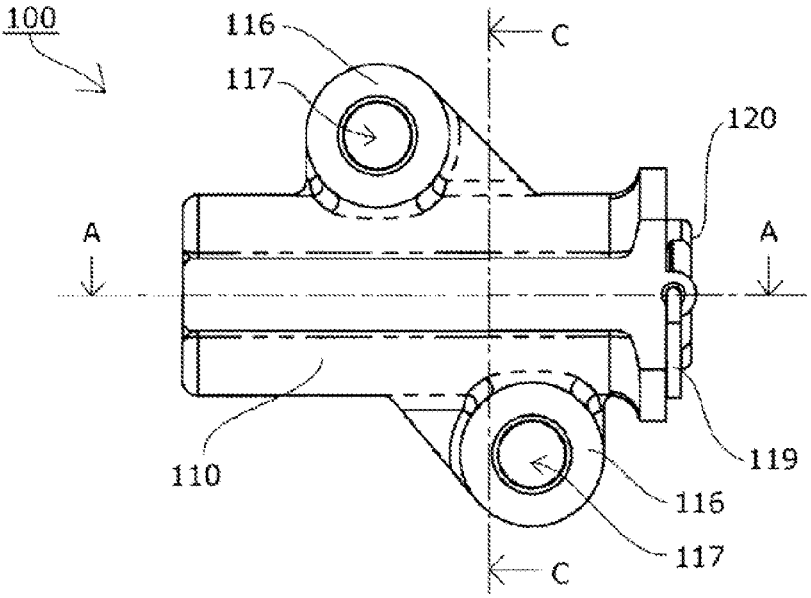
FIG. 1 is a front view of a chain tensioner according to a first embodiment of the present invention.

The chain tensioner of the present invention may be embodied in any specific form as long as: it includes a tensioner body having a cylindrical plunger bore with an open end, a cylindrical plunger slidable within the plunger bore, urging unit accommodated inside an oil pressure chamber formed between the plunger bore and a rear end of the plunger such as to be able to expand and contract and to urge the plunger outward, a connection groove in an outer circumferential surface of the plunger to form a supply chamber between the connection groove and a cylindrical surface of the plunger bore, an oil reservoir chamber formed inside the plunger such as to communicate with the oil pressure chamber via a check valve and to communicate with the supply chamber through a plunger hole opened into the connection groove, an oil supply hole formed in the cylindrical surface of the plunger bore for supplying oil to the supply chamber, and a leak groove formed in the outer circumferential surface of the plunger on a side of the oil pressure chamber such as to extend from the oil pressure chamber to the supply chamber; and as long as it has a simple structure, is universally usable and capable of supplying sufficient and necessary oil when restarted after a long time after the stop of oil supply, and enables reduction of its length and size.

Embodiment 1

A chain tensioner 100 according to a first embodiment of the present invention will be described with reference to the drawings.

The chain tensioner 100 according to a first embodiment of the present invention includes, as shown in FIG. 1 to FIG. 9, a tensioner body 110 having a cylindrical plunger bore 111 with an open end, a cylindrical plunger 120 slidable within the plunger bore 111, and a coil spring 140 that is urging unit accommodated inside an oil pressure chamber 101 formed between the plunger bore 111 and the rear end of the plunger 120 such as to be able to expand and contract and to urge the plunger 120 outward.

The chain tensioner 100 according to this embodiment is securely mounted inside an engine having a chain guide mechanism. For this purpose, the tensioner body 110 has mounting parts 116 with mounting holes 117 for bolts or the like to pass through as shown in FIG. 1 to FIG. 5.

Figure 5:
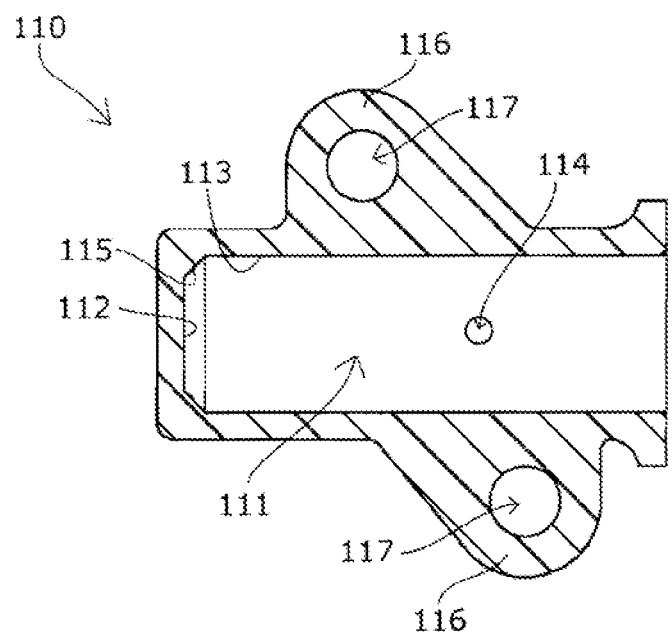
FIG. 5 is a cross-sectional view of only the tensioner body of FIG. 4.
Figure 9:
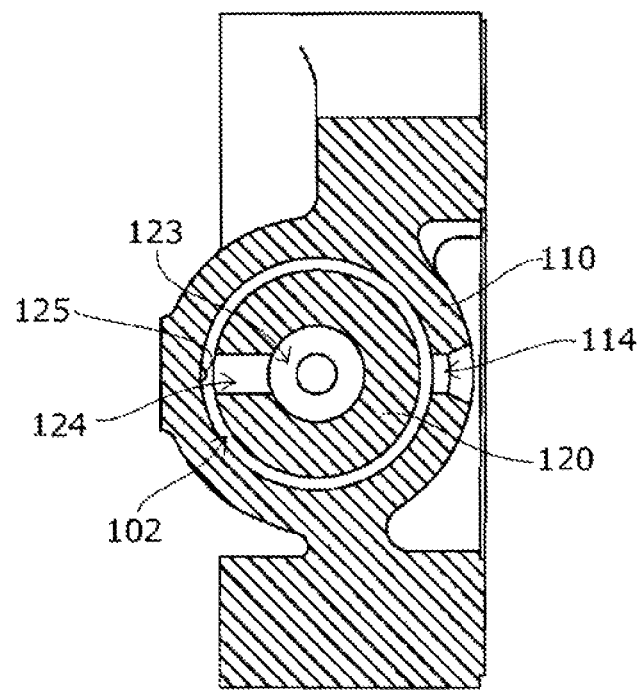
FIG. 9 is a cross-sectional view along C-C of FIG. 1 when the plunger moves.

An oil supply hole 114 is formed in the cylindrical surface 113 of the plunger bore 111 of the tensioner body 110 as shown in FIG. 5 and FIG. 9, which opens to outside so that oil can be supplied.

Figure 2:
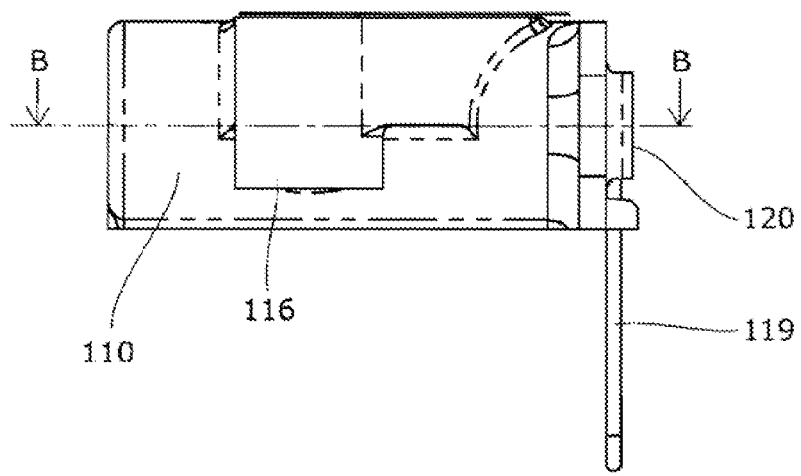
FIG. 2 is a plan view of the chain tensioner according to the first embodiment of the present invention.
Figure 3:
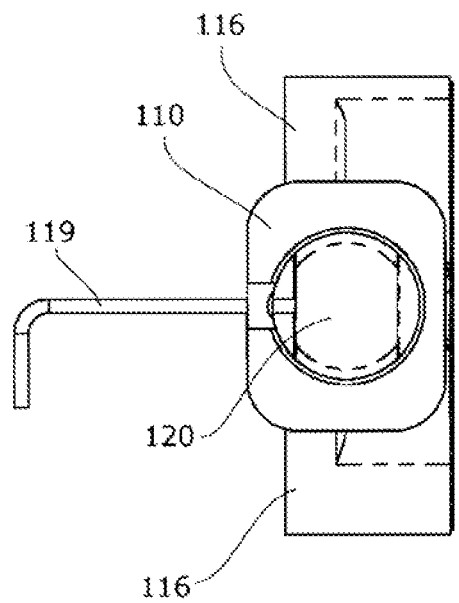
FIG. 3 is a side view of the chain tensioner on one side where a plunger protrudes according to the first embodiment of the present invention.
Figure 8:
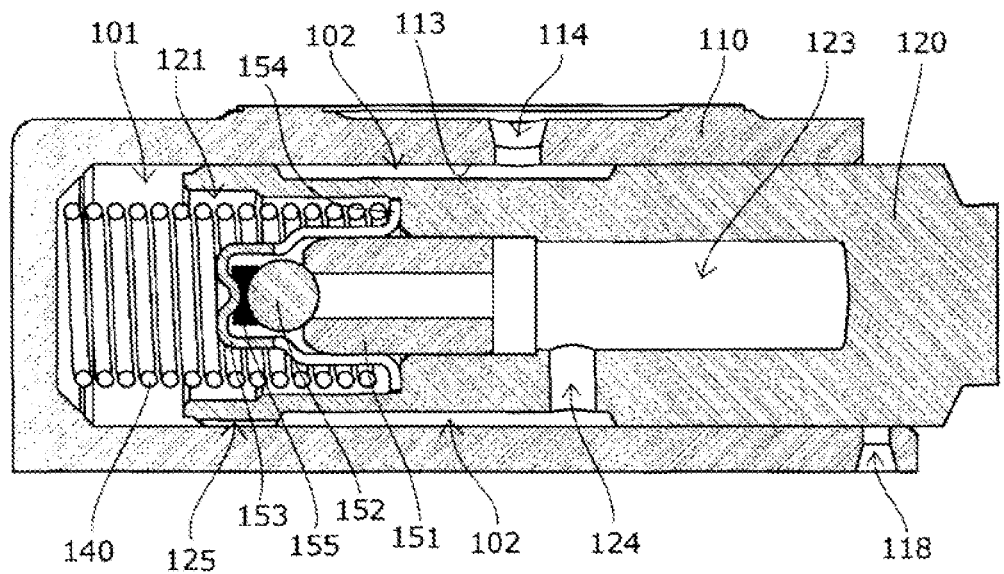
FIG. 8 is a cross-sectional view along A-A of FIG. 1 when the plunger moves.

Near the opening of the plunger bore 111 is formed a pin hole 118 that radially extends through as shown in FIG. 8, so that, with a retainer pin 119 inserted in the pin hole 118 as shown in FIG. 1 to FIG. 3, the plunger 120 can be fixed in its retracted position, to enable mounting of the tensioner including the plunger 120 assembled therein in the engine or any other such work.

A connection groove 122 is formed in the outer circumference of the plunger 120, which forms a supply chamber 102 between itself and the cylindrical surface 113 of the plunger bore 111 as shown in FIG. 4, FIG. 6 to FIG. 9, and a leak groove 125 is provided in the outer circumference on the side of the oil pressure chamber 101 to extend from the oil pressure chamber 101 to the supply chamber 102.

Inside the plunger 120 is formed an oil reservoir chamber 123 that communicates with the oil pressure chamber 101 via a check valve 150 and communicates with the supply chamber 102 through a plunger hole 124 opened into the connection groove 122.

A cylindrical recess 121 opening to the oil pressure chamber 101 is formed in the end face of the plunger 120 on the side of the oil pressure chamber 101 to accommodate the check valve 150 therein.

Figure 4:
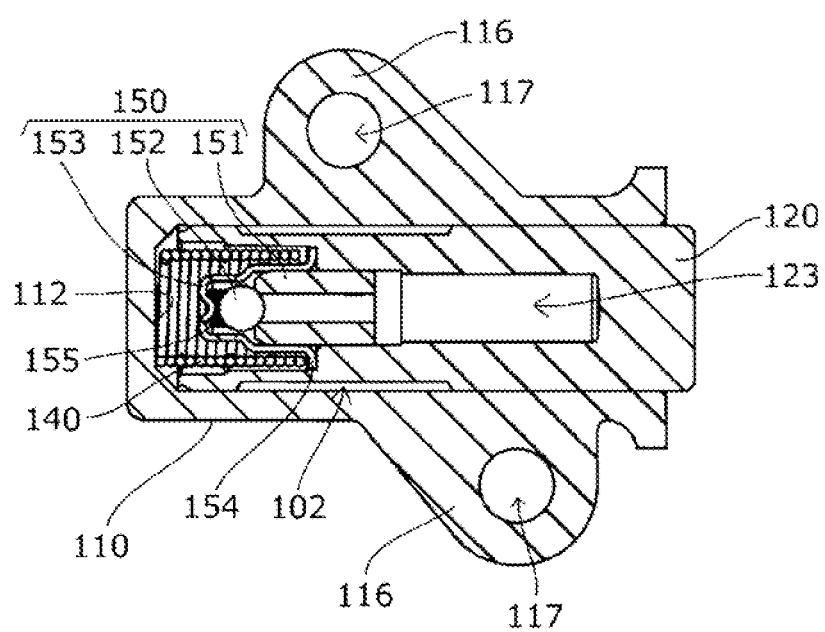
FIG. 4 is a cross-sectional view along B-B of FIG. 2.
Figure 6:
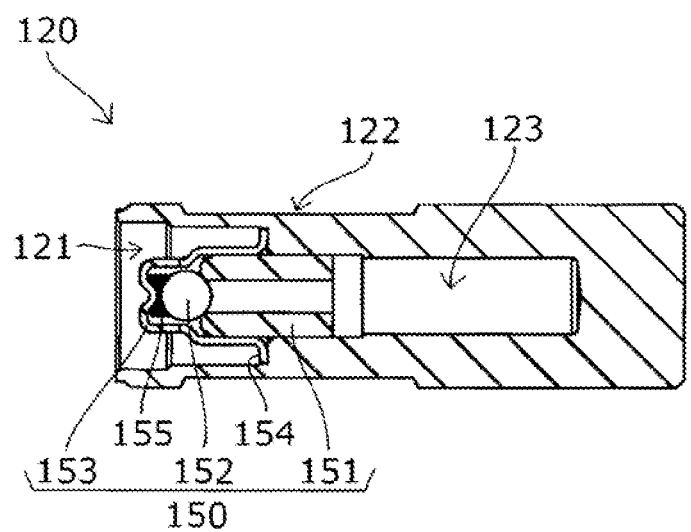
FIG. 6 is a cross-sectional view of only the plunger of FIG. 4.

The check valve 150 includes, as shown in FIG. 4, FIG. 6, and FIG. 8, a ball seat 151 secured to the plunger 120, a check ball 152 that can make sealing contact with the oil passage in the ball seat 151, a retainer 153 that guides the check ball 152, and a compression spring 155 that presses the check ball 152 against the ball seat 151 inside the retainer 153.

The urging unit accommodated inside the oil pressure chamber 101 such as to be able to expand and contract and to urge the plunger 120 outward is a coil spring 140, which is seated at one end on the bottom 112 of the plunger bore 111 and at the other end inside the cylindrical recess 121 as shown in FIG. 4 and FIG. 8.

The other end of the coil spring 140 is seated on an outer flange 154 of the retainer 153 of the check valve 150 at the deepest end of the cylindrical recess 121 so as to efficiently use the depth of the cylindrical recess 121 as the space for the coil spring 140 to expand and contract.

The bottom 112 of the plunger bore 111 is formed as a circular flat surface having the same diameter as that of the coil spring 140. A tapered surface 115 connects the bottom 112 with the cylindrical surface 113 which makes sliding contact with the plunger 120.

One end of the coil spring 140 seated on the bottom 112 is restricted by the tapered surface 115 from moving sideways to prevent looseness or displacement, so that the plunger 120 can reciprocate smoothly.

The tensioner body 110 is attached to a mounting wall portion (not shown) inside the engine that is present on the upper side in FIG. 8 or on the right side in FIG. 9, and the oil supply hole 114 is oriented toward the mounting wall portion.

Figure 7:
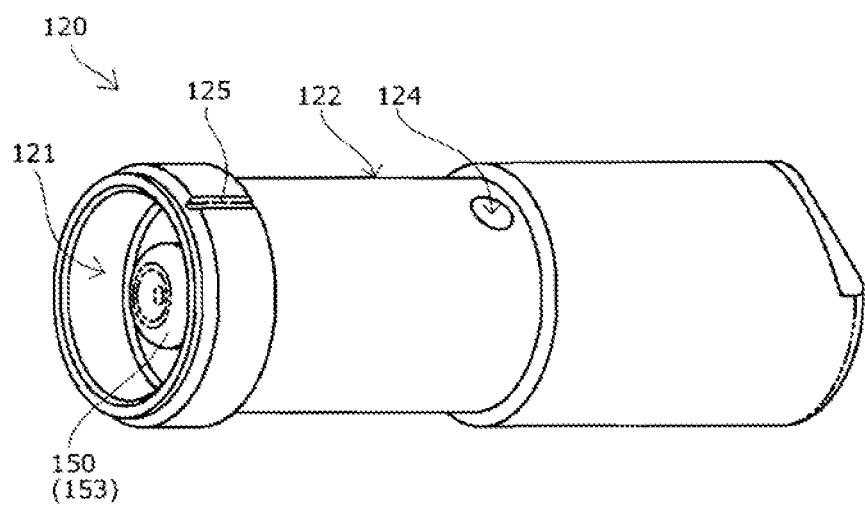
FIG. 7 is a perspective view of the plunger of the chain tensioner according to the first embodiment of the present invention.

The connection groove 122 of the plunger 120 extends all around the outer surface as shown in FIG. 7 so that the supply chamber 102 formed between the groove and the cylindrical surface 113 of the plunger bore 111 is tubular as shown in FIG. 9.

The plunger hole 124 that communicates the oil reservoir chamber 123 inside the plunger 120 with the supply chamber 102 is oriented 180° opposite from the oil supply hole 114 in the cylindrical surface 113 of the plunger bore 111.

The leak groove 125 in the outer circumference of the plunger 120 on the side of the oil pressure chamber 101 is located at the same phase position as that of the plunger hole 124 as shown in FIG. 7 and FIG. 8.

How the chain tensioner 100 according to the first embodiment of the present invention configured as described above operates will be explained with reference to FIG. 8 and FIG. 9.

During normal operation, oil is constantly supplied from oil supply means provided in the mounting wall portion (not shown) through the oil supply hole 114 so that the supply chamber 102 is always filled with oil.

The oil in the supply chamber 102 is fed into the oil reservoir chamber 123 through the plunger hole 124, so that the oil reservoir chamber 123 is also always filled with oil.

The check valve 150 allows the oil to flow in the direction from the oil reservoir chamber 123 into the oil pressure chamber 101. The oil in the oil reservoir chamber 123 is therefore supplied into the oil pressure chamber 101 through the check valve 150, so that the oil pressure chamber 101 is also always filled with oil.

Thus, the plunger 120 is urged outward also by the pressure of oil being supplied from the oil supply means provided in the mounting wall portion (not shown), in addition to the force from the coil spring 140.

When the plunger 120 is pushed inward, the check valve 150 closes, so that oil flows from the oil pressure chamber 101 into the supply chamber 102 through the gap between the plunger 120 and the cylindrical surface 113 of the plunger bore 111. The flow resistance at this time provides a dampening effect whereby the movement of the plunger 120 is dampened.

Next, how the tensioner operates immediately after the start-up after being left a long time after the stop of oil supply (in the case with an engine, after the engine was stopped) will be described.

Since there is a time lag before oil is supplied immediately after the start-up, no oil is supplied to the supply chamber 102 through the oil supply hole 114 for a while, so that the tensioner has to operate only with the oil remaining in the oil pressure chamber 101 and the oil reservoir chamber 123.

When the plunger 120 is pushed inward, as compared to when there is no leak groove 125, oil can flow from the oil pressure chamber 101 quickly into the supply chamber 102 through the gap between the plunger 120 and the cylindrical surface 113 of the plunger bore 111 because of the leak groove 125 where the flow resistance is somewhat lower.

On the other hand, in the gap between the plunger 120 and the cylindrical surface 113 of the plunger bore 111 closer to the distal end than the supply chamber 102, the flow resistance is much higher than in the leak groove 125, so that most of the oil in the supply chamber 102 does not leak out from the distal end but is recovered through the plunger hole 124 into the oil reservoir chamber 123.

The amount of oil leaking to the outside is thus reduced, so that the oil reservoir chamber 123 can have a smaller capacity to hold a sufficient and necessary amount of oil during the time lag before oil is supplied at the restart.

Some of the oil leaking out from the oil pressure chamber 101 into the supply chamber 102 flows out to the oil supply means through the oil supply hole 114. However, since the oil supply means side of the oil supply hole 114 is a sealed space, no large amount of oil flows out there. Therefore, by restricting the amount of oil leaking out from the distal end, a sufficient amount of oil can be recovered from the plunger hole 124 into the oil reservoir chamber 123.

In this embodiment, the plunger hole 124 and the leak groove 125 are located at the same circumferential phase position, while the oil supply hole 114 is located at a circumferentially different phase position from the plunger hole 124.

Therefore, more oil can be directed to the plunger hole 124 as it flows into the supply chamber 102 through the leak groove 125, and, since the oil path from the leak groove to the oil supply hole 114 is long, less oil flows out from the oil supply hole 114, so that more oil can be recovered from the plunger hole 124 into the oil reservoir chamber 123.

Embodiment 2

Figure 10:
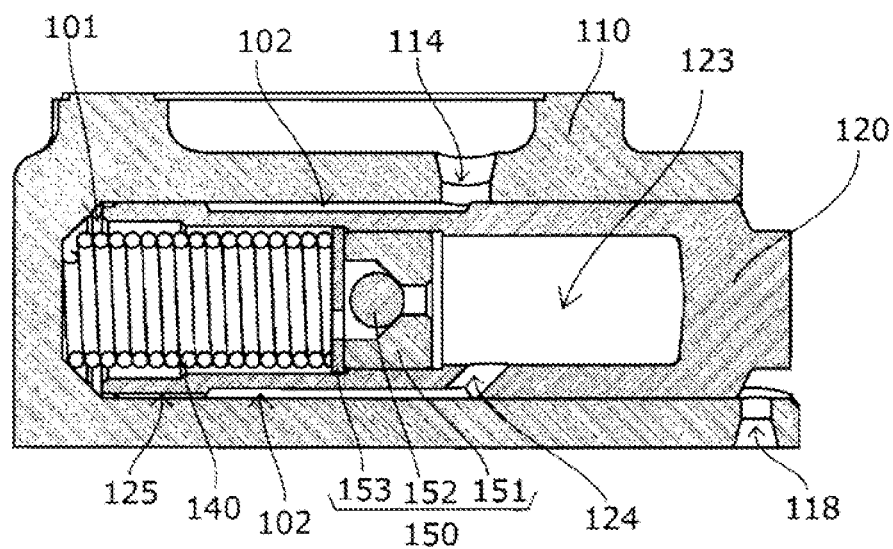
FIG. 10 is a cross-sectional view of the chain tensioner according to a second embodiment of the present invention (section along A-A of FIG. 1)

The chain tensioner according to a second embodiment of the present invention has a different type of check valve, and various constituent parts have different shapes, sizes, and positional relationships with each other, as compared to the chain tensioner 100 according to the previously described first embodiment, as shown in FIG. 10 (reference numerals in the drawing are the same as those of the first embodiment).

The ball seat 151 of the check valve 150 in this embodiment also serves as a ball guide. The retainer 153 is disc-shaped.

The plunger hole 124 is inclined from the outermost end of the supply chamber 102 to open into the oil reservoir chamber 123.

With this embodiment, the oil flowing through the leak groove 125 into the supply chamber 102 can be recovered into the oil reservoir chamber 123 even more smoothly because of the shape of the plunger hole 124 opened diagonally outward.

Embodiment 3

Figure 11:
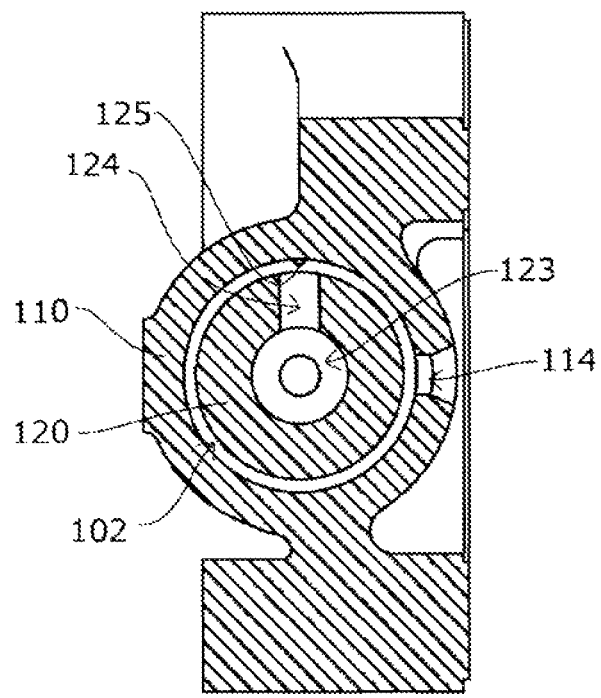
FIG. 11 is a cross-sectional view of the chain tensioner according to a third embodiment of the present invention (section along C-C of FIG. 1)

The chain tensioner according to a third embodiment of the present invention has the plunger hole 124 located at a different position as compared to the chain tensioner 100 according to the previously described first embodiment, as shown in FIG. 11 (reference numerals in the drawing are the same as those of the first embodiment).

The plunger hole 124 in this embodiment is oriented at right angles from the oil supply hole 114 formed in the cylindrical surface 113 of the plunger bore 111 so that it opens upward when the chain tensioner 100 is mounted in the engine.

The leak groove 125 in the outer circumference of the plunger 120 on the side of the oil pressure chamber 101 is located at the same phase position as that of the plunger hole 124.

With this embodiment, even a slightest leak of oil caused by a reverse flow from the oil reservoir chamber 123 into the oil supply hole 114 can be prevented reliably after the stop of oil supply (in the case with an engine, after the engine is stopped) when let stand for a long time. Also, even immediately after the start-up after a long non-use period, a sufficient and necessary amount of oil can be secured.

Embodiment 4

Figure 12:
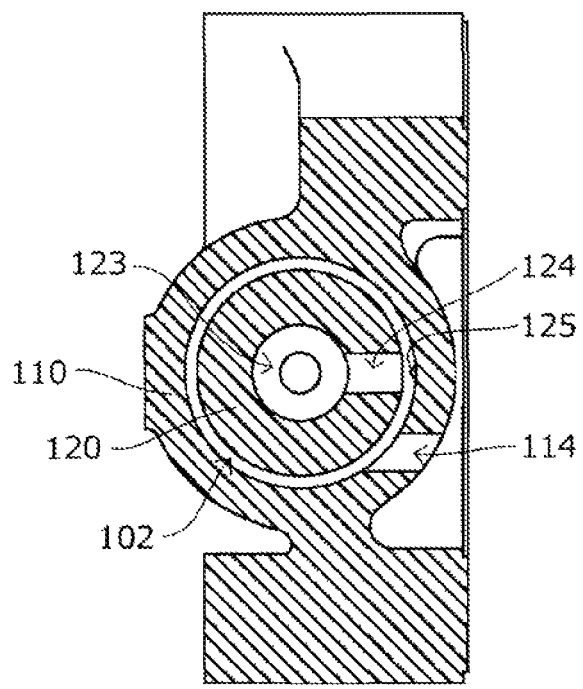
FIG. 12 is a cross-sectional view of the chain tensioner according to a fourth embodiment of the present invention (section along C-C of FIG. 1)
Figure 13:
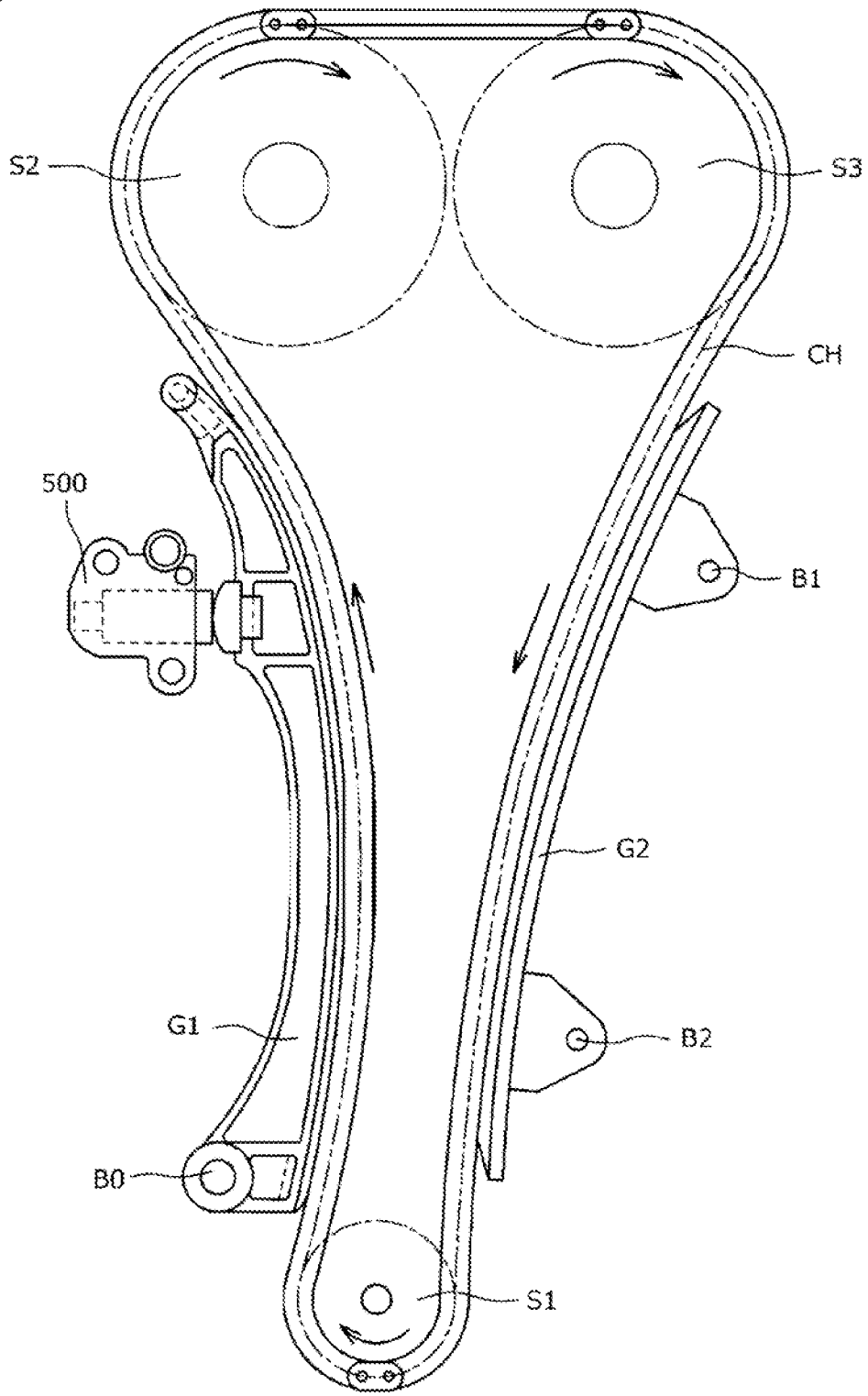
FIG. 13 is a diagram illustrating the chain tensioner used in a chain guide mechanism of an engine.
Figure 14:
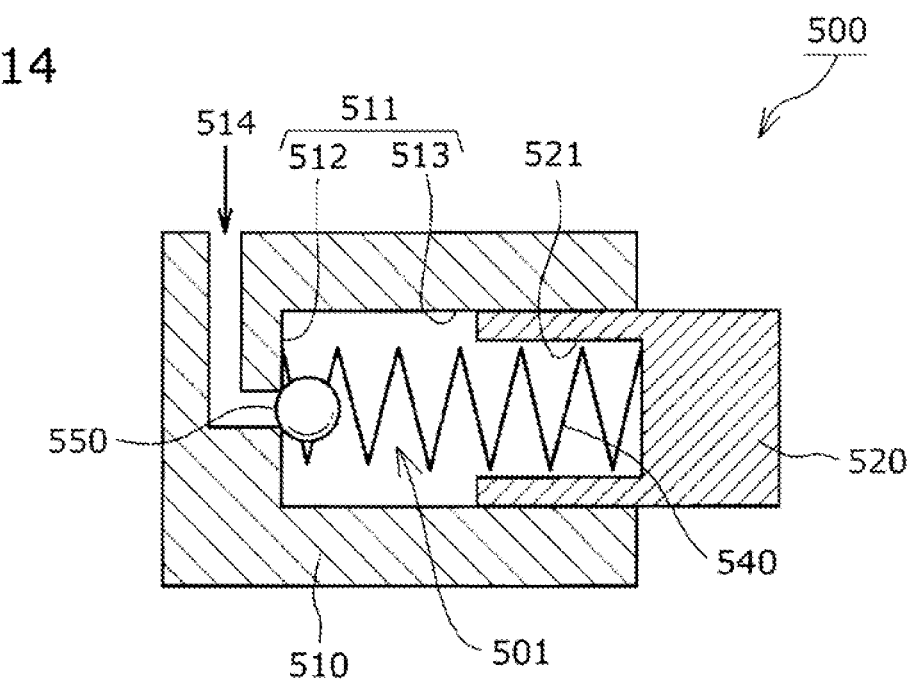
FIG. 14 is a schematic diagram illustrating a conventional chain tensioner.

The chain tensioner according to a fourth embodiment of the present invention has different locations and shapes of the plunger hole 124 and the oil supply hole 114 as compared to the chain tensioner 100 according to the previously described first to third embodiments, as shown in FIG. 12 (reference numerals in the drawing are the same as those of the first embodiment).

The plunger hole 124 in this embodiment is oriented toward the mounting wall portion, and the oil supply hole 114 is slightly offset from the plunger hole 124 and extends perpendicularly to the mounting wall portion.

The leak groove 125 in the outer circumference of the plunger 120 on the side of the oil pressure chamber 101 is located at the same phase position as that of the plunger hole 124.

With this embodiment, the plunger hole 124 and the oil supply hole 114 are located closer, so that the flow resistance of oil being supplied into the supply chamber 102 is lowered during the normal operation. Moreover, since the plunger hole 124 extends perpendicularly to the mounting wall portion, oil can be smoothly supplied into the supply chamber 102 from the oil supply means provided in the mounting wall portion.

While specific examples of the chain tensioner according to the present invention have been described in the embodiments above, the chain tensioner according to the present invention is not limited to these examples, and the shapes, positions, sizes, and positional relationships with each other of various constituent parts may be changed in various manners.

For example, while the connection groove 122 of the plunger 120 extends all around in the outer surface as shown in FIG. 7 in the embodiments described above so that the supply chamber 102 formed between the plunger and the cylindrical surface 113 of the plunger bore 111 is tubular, the connection groove 122 may be formed only in part of the outer circumference of the plunger 120 (in such a shape as, for example, the connection groove 123 of Japanese Patent Publication No. 4376278 mentioned above), so that the supply chamber 102 does not extend all around, as long as oil can be supplied during normal operation and recovered into the oil reservoir chamber 123 at start-up.

The leak groove 125 formed in the outer circumference of the plunger 120 on the side of the oil pressure chamber 101 may have any cross-sectional shape, depth, circumferential width, and the like, which may be selected suitably in accordance with the environment of its application, as long as it serves the purpose of the present invention and works as described above.

Other components commonly included in a chain tensioner, such as a ratchet mechanism, may of course be added to the configurations of the embodiments described above.

The chain tensioner of the present invention may not necessarily be applied to a chain guide mechanism that uses a guide shoe for slidably guiding a transmission chain such as an endless roller chain passing over respective sprockets of a crankshaft and a cam shaft in an engine room, but may also be adopted in applications where the chain is slidably guided by the distal end of the plunger.

The chain tensioner may not necessarily be applied to a chain transmission mechanism but also used for similar transmission mechanisms that use belts, ropes and the like. The chain tensioner of the present invention, including a tensioner body having a cylindrical plunger bore with an open end, a cylindrical plunger slidable within the plunger bore, and urging unit accommodated inside an oil pressure chamber formed between the plunger bore and a rear end of the plunger such as to be able to expand and contract and to urge the plunger outward, is applicable for use in various industrial fields where sufficient oil needs to be supplied at restart after a long time after the stop of oil supply.

What is claimed is:

1. A chain tensioner comprising: a tensioner body having a cylindrical plunger bore with an open end; a cylindrical plunger slidable within the plunger bore; urging unit accommodated inside an oil pressure chamber formed between the plunger bore and a rear end of the plunger such as to be able to expand and contract and to urge the plunger outward;
   a connection groove in an outer circumferential surface of the plunger to form a supply chamber between the connection groove and a cylindrical surface of the plunger bore;
   an oil reservoir chamber formed inside the plunger such as to communicate with the oil pressure chamber via a check valve and to communicate with the supply chamber through a plunger hole opened into the connection groove;
   an oil supply hole formed in the cylindrical surface of the plunger bore for supplying oil to the supply chamber; and
   a leak groove formed in the outer circumferential surface of the plunger on a side of the oil pressure chamber such as to extend from the oil pressure chamber to the supply chamber.

2. The chain tensioner according to claim 1, wherein the leak groove is located at a circumferentially same phase position as the plunger hole.

3. The chain tensioner according to claim 2, wherein the oil supply hole is located at a circumferentially different phase position from the plunger hole.

4. The chain tensioner according to claim 1, wherein the plunger hole has a larger diameter than the oil supply hole.

5. The chain tensioner according to claim 1, wherein a cylindrical recess open to the oil pressure chamber is formed in an end face of the plunger on a side of the oil pressure chamber,
   the check valve being accommodated in the cylindrical recess.

6. The chain tensioner according to claim 5, wherein the urging unit includes a coil spring having one end seated on a bottom of the plunger bore and the other end seated in the cylindrical recess.

7. The chain tensioner according to claim 6, wherein the check valve includes a ball seat secured to the plunger, a check ball capable of making sealing contact with an oil passage in the ball seat, and a retainer that guides the check ball,
   the other end of the coil spring being seated on an outer flange of the retainer in the cylindrical recess.

8. The chain tensioner according to claim 6, wherein the bottom of the plunger bore is formed as a circular flat surface with a same diameter as the coil spring, and has a tapered surface that connects the bottom with the cylindrical surface sliding with the plunger.

* * * * *